Jan. 29, 1946.   W. J. KIRKPATRICK   2,393,915
TERPENE ISOMERIZATION
Filed Dec. 2, 1942
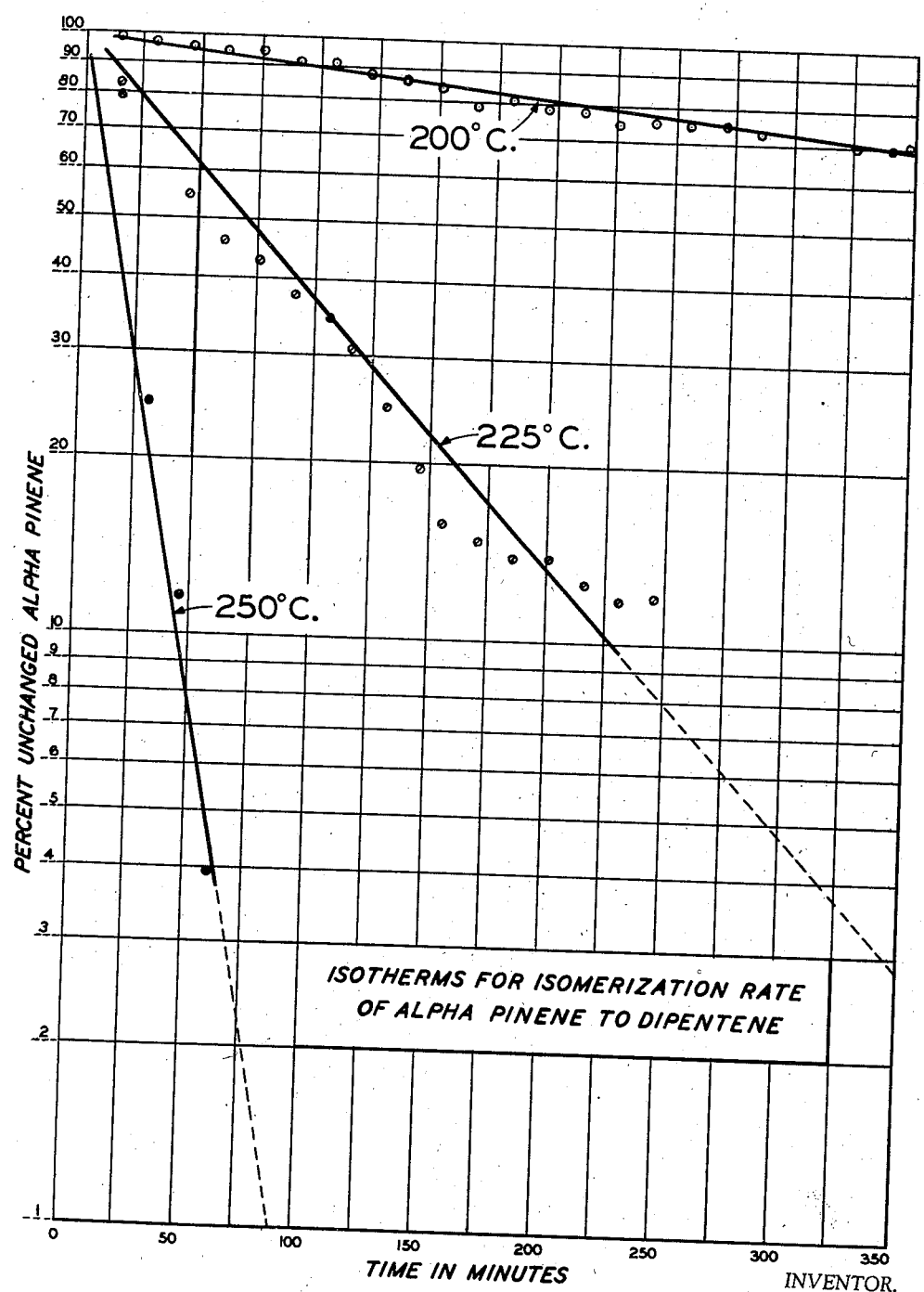
ISOTHERMS FOR ISOMERIZATION RATE OF ALPHA PINENE TO DIPENTENE
INVENTOR.
WILLIAM J. KIRKPATRICK
BY
Cleveland B. Hollabaugh Patented Jan. 29, 1946

2,393,915

UNITED STATES PATENT OFFICE 2,393,915

TERPENE ISOMERIZATION

William J. Kirkpatrick, Marshalltown, Del., assignor to Hercules Powder Company, Wilmington, Del., a corporation of Delaware Application December 2, 1942, Serial No. 467,568

21 Claims. (Cl. 260—675.5)

This invention relates to improvements in terpene isomerization, and more particularly relates to the isomerization of a bicyclic terpene to a menthadiene and specifically to the selective isomerization of pinene to dipentene in the presence of an alkali catalyst.

Many methods have been reported in the literature for the isomerization of terpenes based upon the use of a catalyst having an acid reaction. Most methods show that catalysts having an acid reaction are necessary for the isomerization of certain terpenes as alpha-pinene to dipentene. These methods always lead to mixtures of terpenes which are extremely difficult to separate by any known method. In every case where an acid catalyst is used to effect the isomerization of alpha-pinene to dipentene, there are formed together with the dipentene such terpenes as alpha-terpinene, gamma-terpinene, etc. These components are especially difficult to separate because of their relatively close boiling points. The presence of alpha-terpinene has been found undesirable when using dipentene in certain chemical reactions hereinafter set forth.

Now, in accordance with the present invention, it has been discovered that terpenes, especially bicyclic terpenes and particularly alpha-pinene, and beta-pinene may be selectively isomerized to dipentene without the formation of the undesirable alpha-terpinene when a compound having an alkaline reaction is used as a catalyst.

A method of carrying out the process of this invention is illustrated by the following specific examples, which are not to be construed as limiting, in which the parts expressed are by weight:

EXAMPLE 1

One hundred parts of commercial alpha-pinene containing 93% alpha-pinene and 100 parts of a 1% water solution of sodium hydroxide were charged into a silver-lined autoclave equipped with means for agitation. The mixture was agitated for a period of two hours at a temperature of 250° C. The resulting mixture was allowed to cool to 90° C. and then removed from the autoclave. After the oil and water layers had separated, the oil layer was decanted from the water layer. Steam distillation of the oil layer resulted in a steam-volatile portion which was dried with anhydrous potassium carbonate and subjected to fractional distillation. One hundred parts of the oil layer gave 77 parts of steam-volatile material and 23 parts of nonsteam-volatile material. One hundred parts of the steam-volatile material on fractional distillation gave the following cuts:

| | Parts |
|---|---|
| Boiling below alpha-pinene | 1.3 |
| Alpha-pinene | 15.55 |
| Boiling below dipentene and above alpha-pinene | 29.7 |
| Pure dipentene | 28.15 |
| Boiling above dipentene [1] | 6.2 |
| Residue [1] | 13.2 |
| Distillation loss | 6.17 |

[1] Principally allo-ocimene as dimer or polymer.

The constant boiling material taken as pure dipentene had the following constants:

$n_D^{20}$ ---------------------------------- 1.4732
$D_4^{20}$ ---------------------------------- 0.8440
$[\alpha]_D^{20}$ -------------------------- −1.15 to −1.20

The material boiling between alpha-pinene and dipentene was found to be about 55% dipentene on further fractional distillation.

EXAMPLE 2

Six hundred sixty parts beta-pinene (about 90%), 750 parts distilled water and 15 parts diamylamine were charged into a silver-lined autoclave. The temperature was raised as rapidly as possible to 280° C. and held at this temperature for 15 minutes. Agitation sufficient to keep the phases well mixed was maintained during the entire time. After cooling to 90° C., the water and oil layers were separated and the remaining diamylamine washed out of the oil layer with water. The oil layer was steam distilled. 84% was volatile with steam. Of this 84%, 23% boiled in the dipentene range (176° C.–177° C. at 750 mm. to 755 mm. of mercury pressure) and had the refractive index and other characteristics of dipentene. 27% boiled above dipentene.

Each of the following examples was carried out in the same manner indicated for Example 1.

Table

| Ex. | Terpene | Parts | Alkaline catalyst | Parts | Reaction temp. °C. | Reaction time | Fractionation of isomer recovered |
|---|---|---|---|---|---|---|---|
| | Sulfate wood turpentine | 100 | 3% water solution of NaOH | 100 | 250 | 2 hours | 40% dipentene, 60% (unchanged pinene allo-ocimene, polymer, etc.). |
| | Wood turpentine | 100 | ----do---- | 100 | 250 | ----do---- | 35% dipentene, 65% (unchanged pinene camphene, allo-ocimene, polymer, etc.). |
| | Alpha-pinene | 100 | 1% water solution of Na₃PO₄ | 100 | 250 | ----do---- | 40% dipentene, 60% (unchanged pinene camphene, allo-ocimene, polymer, etc.). |
| | Beta-pinene | 100 | 1.66% water solution of triethanolamine | 100 | 280 | 15 minutes | 35% dipentene, 65% (unchanged pinene camphene, allo-ocimene, polymer, etc.). |
| | Alpha-pinene | 100 | 1% water solution of diamylamine | 100 | 260 | 30 minutes | 30% dipentene, 70% (unchanged pinene, camphene, allo-ocimene, polymer, etc.). |

It is to be understood that the product obtained in the above examples may contain considerably more dipentene than could be readily recovered by fractional distillation and that this invention is not limited by the means used for isolating the dipentene or other isomers formed.

A method of selectively isomerizing a terpene using an alkaline catalyst to produce from alpha-pinene allo-ocimene free of myrcene, and to produce from alpha-pinene dipentene free of alpha-terpinene has been discovered. In each of the foregoing examples, no alpha-terpinene was found in the reaction product resulting from the isomerization process. When the starting material consisted of a turpentine as used in Examples 2, 3, and 4, a mixture of allo-ocimene and myrcene was produced in addition to the dipentene. Alpha-pinene was used as the starting material in Examples 1, 5, and 7 and after being subjected to the isomerization process resulted in the formation of the isomers, dipentene, and allo-ocimene. When a catalyst having a weak alkaline reaction such as diamyl amine or aniline was used, the percent of dipentene recovered was greater than the percent of allo-ocimene formed, and when a strong alkali suc has tetramethyl ammonium hydroxide was used as the alkaline catalyst, a greater percent of allo-ocimene was formed than dipentene.

The sulfate terpentine treated in accordance with this invention may be the sulfate turpentine obtained by a by-product in the manufacture of wood pulp cellulose by the sulfate process.

The wood turpentine used in accordance with this invention may contain as high as 95% alpha-pinene and small percentages of beta-pinene, limonene, and terpinolene.

The composition of the gum turpentine used in accordance with this invention depends largely upon its source. Gum turpentine from the slash pine (Pinus echinata) may contain as high as 75% alpha-pinene and 21% beta-pinene, whereas when long leaf pine (Pinus palustris, Pinus australis, Pinus longifolio) is the source alpha-pinene may be present in an amount as high as 65%. Beta-pinene may be present in an amount as high as 32%. French gum turpentine may be obtained from such pines as Pinus maritima, Pinus pinaster soland, Pin d'Alep, Pinus sylvestre, Pinus holepensis mill, etc., and has the following approximate composition: alpha-pinene 60%, beta-pinene 17%, carene 17% together with small amounts of alcohols, esters, etc. This invention is not limited to the above-noted turpentines, but may be applied to other turpentines derived from oleoresinous plants, provided the turpentines contain terpenes. Furthermore, it is not necessary to separate the terpenes from their congeners. Accordingly, saps, gum dip (gemmes) and other exudates or extractives may be used.

Other terpenes found suitable for treatment in accordance with the present invention are the bicyclic terpenes of the carene group which readily isomerize to sylvestrene, as, for example, $d-\Delta 4$ carene which readily isomerizes to a menthadiene, the isopropyl group of which is in the meta position relative to the methyl group on the hexene ring. When pinene is isomerized under the conditions of the present invention, it is to be noted that the menthadiene formed has the isopropyl group in the para position relative to the methyl group on the hexene ring.

The process of the present invention may be carried out by heating a terpene, particularly, alpha-pinene, to a temperature at or above the boiling point of the terpene being isomerized and preferably at a temperature between about 240° C. and 270° C.

The time required for substantially complete conversion of the terpene, particularly alpha-pinene, has been found to vary in accordance with the chart disclosed by the drawing and entitled "Isotherms for isomerization rate of alpha-pinene to dipentene."

Referring to the chart there are disclosed three isotherms or curves representing the rate of isomerization of alpha-pinene to dipentene under specific conditions of treatment. The rate studies were made on a mixture of 750 parts of commercial pinene (known in the trade as Hercules pinene 111) diluted with 750 parts of distilled water and catalyzed with 1 part of sodium hydroxide. This charge was treated at a predetermined temperature represented by the isotherms of the chart as rapidly as possible in an autoclave equipped with a stirring mechanism which was in operation during the warming-up period. At various time intervals, which are laid off on the abscissa of the chart, samples were withdrawn from the autoclave by means of a sampling tube and the optical rotation of the oil layer of the sample was determined in the usual manner using the D line of the spectrum. The optical rotation value of each sample taken at the various time intervals was converted into percent concentration of alpha-pinene by use of the following formula:

$$\text{Percent concentration of alpha-pinene} = \frac{(\text{specific rotation at time } t) \times 100}{\text{specific rot. at time zero}}$$

The specific rotation of the original or untreated alpha-pinene was 28° using the D line and measured at room temperature (20° C.). All values of concentration of unchanged alpha-pinene for each of the three isotherms were reduced to a common basis by using as the denominator for the equation the specific rotation value of the alpha-pinene measured at the moment the mixture reached temperature as, for example, 200° C., 225° C., or 250° C., such temperatures being average temperatures during the time and subject to an error of about ±6° C. At predetermined time intervals measured from the moment the mixture reached temperature, samples of the mixture were withdrawn from the reaction chamber for optical rotation measurements. This same procedure was followed in each of the three different temperature levels. Plotting the percent unchanged alpha-pinene against time in minutes on a semi-logarithmic chart, substantially straight curves may be drawn as shown by the full lines and identified as isotherms 200° C., 225° C., and 250° C. Isotherms 225° C. and 250° C. have been extended to meet the ordinate and abscissa of the chart.

It may be seen from these alpha-pinene isomerization isotherms that the rate of conversion of alpha-pinene to dipentene is relatively slow at a temperature below its boiling point and that the rate of conversion increases considerably as the temperature is increased. Under different conditions of treatment in accordance with this invention, isotherms showing a different rate of conversion may be obtained.

The alkaline catalysts or catalysts having an alkaline reaction found suitable in accordance with this invention are alkali metal and alkaline earth metal water-soluble hydroxides, carbonates, sulfites, phosphates, silicates and salts of weak acids which hydrolyze readily to give basic solutions under the conditions of temperature and pressure at which the process of this invention is carried out. Catalysts having an alkaline reaction which are especially desirable in carrying out the process of this invention are potassium hydroxide, sodium hydroxide, potassium carbonate, sodium carbonate, potassium silicate, tri-sodium phosphate, sodium hexa-meta-phosphate, sodium sulfite, sodium silicate, potassium sulfite, cesium hydroxide, rubidium hydroxide, etc. Other alkaline catalysts suitable for the purposes of this invention are the organic bases as, for example, tetramethyl ammonium hydroxide, guanidinium hydroxide, piperidinium hydroxide, ammonium hydroxide, triethanol amine, diamyl amine, triamyl amine, aniline, etc.

The ratio of the alkali catalysts may vary within wide limits, depending upon the particular catalyst being used. When potassium or sodium hydroxide is used as the catalyst, it is preferred to use these catalysts in aqueous or alcoholic solution in a concentration of between about 0.5% and about 5%. When it is desired to obtain a readily polymerizable isomer such as allo-ocimene from alpha-pinene, it is preferred to use organic amines as the alkaline catalysts which are capable of inhibiting polymerization.

All of the alkaline catalysts of the general types herein disclosed are suitable for isomerizing alpha-pinene to dipentene free of alpha-terpinine. However, in addition to dipentene there is obtained more or less allo-ocimene as a by-product depending on the catalyst being used. This allo-ocimene may be obtained as a monomer or polymer depending on the alkaline catalyst chosen and the pressure used. In general, it is preferred to use organic bases when allo-ocimene is desired as a monomer. This same generalization holds for the other terpenes.

Other inert solvents such as alcohols as well as water may be used as solvents for the catalyst. Suitable alcohols are methyl alcohol, ethyl alcohol, propyl alcohol, isopropyl alcohol, butyl alcohol, dihydric alcohols as, for example, ethylene glycol, diethylene glycol, propylene glycol, and trihydric alcohols, such as glycerol and trimethanol methane.

The process may be carried out continuously by passing the mixture of alpha-pinene or other terpenes capable of being isomerized under the conditions of this invention together with a water or alcohol solution of the alkaline catalyst through suitable tubes or other chambers maintained at a temperature above the boiling point of the terpene being isomerized. If the amine is soluble in the liquid terpene or miscible with the terpene vapor or gas at the temperature of operation, no other solvent need be used.

In accordance with the process of the present invention a comparatively pure solution of dipentene may be obtained by the isomerization of a terpene using an alkaline catalyst and heating at a temperature above the boiling point of the terpene being treated. In contrast to the results obtained in accordance with the present invention using an alkaline catalyst, it is to be noted that a catalyst other than an alkaline catalyst as, for example, an acid catalyst or a neutral catalyst as, for example, water, produces a substantially complex mixture of materials. The dipentene obtained in accordance with the process of this invention may, for example, be selectively hydrogenated to carvomenthene in substantially quantitative yields at pressures of 1-3 atmospheres and temperatures below 50° C. while mixtures of dipentene arising from nonalkali isomerization conditions require temperatures up to 100° C. or higher and yield considerable proportions of para-menthane thereby materially decreasing the yield of carvomenthene and making necessary a difficult fractional distillation to separate the para-menthane from the carvomenthene. The dipentene produced in accordance with the present invention is particularly desirable as a raw material in the cracking of the dipentene to isoprene for use in the manufacture of synthetic rubber. Dipentene produced in accordance with nonalkaline isomerization conditions contains alpha-terpinene and other terpenes which are extremely undesirable in carrying out the selective hydrogenation and cracking of the dipentene.

In view of the foregoing, it is obvious that a new process has been provided for the production of dipentene by the isomerization of a terpene using an alkaline catalyst heating at a temperature above 200° C.

What I claim and desire to protect by Letters Patent is:

1. The process for producing a menthadiene from a bicyclic terpene selected from the group consisting of pinene and carene which comprises heating the said bicyclic terpene above its boiling point in the presence of a dissolved catalyst having an alkaline reaction.

2. The process for producing a menthadiene from a bicyclic terpene selected from the group consisting of pinene and carene which comprises heating the said bicyclic terpene above its boiling point in the presence of a dissolved organic base catalyst.

3. The process for producing a menthadiene from a bicyclic terpene selected from the group consisting of pinene and carene which comprises heating the said bicyclic terpene above its boiling point in the presence of a dissolved water-soluble inorganic base catalyst.

4. The process for producing a menthadiene from a bicyclic terpene selected from the group consisting of pinene and carene which comprises heating the said bicyclic terpene above its boiling point in the presence of dissolved sodium hydroxide.

5. The process for producing a menthadiene from a bicyclic terpene selected from the group consisting of pinene and carene which comprises heating the said bicyclic terpene above its boiling point in the presence of aqueous sodium hydroxide.

6. The process for producing a menthadiene from a bicyclic terpene selected from the group consisting of pinene and carene which comprises heating the said bicyclic terpene above its boiling point in the presence of dissolved triethanol amine.

7. The process for producing a menthadiene from a bicyclic terpene selected from the group consisting of pinene and carene which comprises heating the said bicyclic terpene above its boiling point in the presence of dissolved diamyl amine.

8. The process for producing a menthadiene from a bicyclic terpene selected from the group consisting of pinene and carene which comprises heating the said bicyclic terpene at a temperature between about 240° C. and about 270° C. in the presence of a dissolved catalyst having an alkaline reaction.

9. The process for producing dipentene which comprises heating pinene above its boiling point in the presence of a dissolved catalyst having an alkaline reaction.

10. The process for producing dipentene which comprises heating turpentine above its boiling point in the presence of a dissolved catalyst having an alkaline reaction.

11. The process for producing dipentene which comprises heating alpha-pinene above its boiling point in the presence of a dissolved catalyst having an alkaline reaction.

12. The process for producing dipentene which comprises heating beta-pinene above its boiling point in the presence of a dissolved catalyst having an alkaline reaction.

13. The process for producing dipentene which comprises heating wood turpentine above its boiling point in the presence of a dissolved catalyst having an alkaline reaction.

14. The process for producing dipentene which comprises heating alpha-pinene above its boiling point in the presence of dissolved sodium hydroxide.

15. The process for producing dipentene which comprises heating alpha-pinene above its boiling point in the presence of aqueous sodium hydroxide.

16. The process for producing dipentene which comprises heating beta-pinene above its boiling point in the presence of dissolved sodium hydroxide.

17. The process for producing dipentene which comprises heating wood turpentine above its boiling point in the presence of dissolved sodium hydroxide.

18. The process for producing dipentene which comprises heating alpha-pinene between about 240° C. and about 270° C. in the presence of dissolved sodium hydroxide.

19. The process for producing dipentene which comprises heating beta-pinene between about 240° C. and about 270° C. in the presence of dissolved sodium hydroxide.

20. The process for producing a menthadiene from a bicyclic terpene selected from the group consisting of pinene and carene which comprises heating the said bicyclic terpene above its boiling point in the presence of an alkaline catalyst capable of existing in the vapor phase under said heating conditions.

21. The process for producing dipentene which comprises heating alpha-pinene above its boiling point in the presence of a dissolved catalyst having an alkaline reaction, and separating the reaction mixture into a dipentene fraction and an allo-ocimene fraction by distillation.

WILLIAM J. KIRKPATRICK.